US010911792B2

(12) United States Patent
Pio

(10) Patent No.: US 10,911,792 B2
(45) Date of Patent: Feb. 2, 2021

(54) SYSTEMS AND METHODS FOR DETERMINING PROCESSING COMPLETENESS WITHIN A DISTRIBUTED MEDIA ITEM PROCESSING ENVIRONMENT

(71) Applicant: Facebook, Inc., Menlo Park, CA (US)

(72) Inventor: David Young Joon Pio, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 13 days.

(21) Appl. No.: 15/852,563

(22) Filed: Dec. 22, 2017

(65) Prior Publication Data

US 2019/0200048 A1    Jun. 27, 2019

(51) Int. Cl.
| | | |
|---|---|---|
| *H04N 21/234* | (2011.01) | |
| *H04N 21/233* | (2011.01) | |
| *H04N 19/10* | (2014.01) | |
| *H04L 29/08* | (2006.01) | |
| *G06Q 50/00* | (2012.01) | |

(52) U.S. Cl.
CPC .......... *H04N 21/234* (2013.01); *H04L 67/06* (2013.01); *H04N 19/10* (2014.11); *H04N 21/233* (2013.01); *G06Q 50/01* (2013.01)

(58) Field of Classification Search
CPC .... H04N 21/233; H04N 21/234; H04N 19/10; H04L 67/06; G06Q 50/01
See application file for complete search history.

(56) References Cited

U.S. PATENT DOCUMENTS

| | | | | |
|---|---|---|---|---|
| 2013/0114744 A1* | 5/2013 | Mutton | .................. | H04N 19/40 375/240.26 |
| 2015/0367236 A1* | 12/2015 | Morimura | ............... | A63F 13/53 463/31 |
| 2016/0065668 A1* | 3/2016 | Kumar | .................. | H04L 67/325 709/219 |
| 2017/0041296 A1* | 2/2017 | Ford | ..................... | G06F 16/951 |
| 2017/0078687 A1* | 3/2017 | Coward | ............... | H04N 19/395 |
| 2017/0371758 A1* | 12/2017 | Cherkalova | ............. | G06F 9/451 |

OTHER PUBLICATIONS

Yu-Jie Lin, "progressive, nested, multiple, beautiful progress bar in Python", May 2, 2014, YouTube.com (https://www.youtube.com/watch?v=jpOsorko9Lg) (Year: 2014).*

* cited by examiner

*Primary Examiner* — Nicholas T Corbo
(74) *Attorney, Agent, or Firm* — Sheppard Mullin Richter & Hampton LLP

(57) ABSTRACT

Systems, methods, and non-transitory computer readable media are configured to receive a media item. The media item can be split into a plurality of segments. The plurality of segments can be subjected to a plurality of distributed prepublication processing stages. One or more stage progress reports can be received. Each of the one or more stage progress reports can indicate an extent complete of one of the plurality of distributed prepublication processing stages for one of the plurality of segments. An overall extent complete can be calculated with respect to the media item based on the one or more stage progress reports.

20 Claims, 8 Drawing Sheets

SYSTEMS AND METHODS FOR DETERMINING PROCESSING COMPLETENESS WITHIN A DISTRIBUTED MEDIA ITEM PROCESSING ENVIRONMENT

FIELD OF THE INVENTION

The present technology relates to the field of processing media items for consumption. More particularly, the present technology relates to techniques for determining processing completeness within a distributed media item processing environment.

BACKGROUND

Users often employ computing devices for a wide variety of purposes. Users can use their computing devices to, for example, interact with one another, access media items, share media items, and create media items. In some cases, media items can be provided by users of a social networking system. The media items can include video and/or audio. The media item can be processed and then published to the social networking system for consumption by others.

SUMMARY

Various embodiments of the present disclosure can include systems, methods, and non-transitory computer readable media configured to receive a media item. The media item can be split into a plurality of segments. The plurality of segments can be subjected to a plurality of distributed prepublication processing stages. One or more stage progress reports can be received. Each of the one or more stage progress reports can indicate an extent complete of one of the plurality of distributed prepublication processing stages for one of the plurality of segments. An overall extent complete can be calculated with respect to the media item based on the one or more stage progress reports.

In an embodiment, an extent complete for a segment of the plurality of segments can be calculated based on stage progress reports associated with the segment.

In an embodiment, calculating the overall extent complete can comprise calculating a sum across the extents complete calculated for each of the plurality of segments.

In an embodiment, calculating the extent complete for a segment can comprise calculating a sum across stage progress reports associated with the segment.

In an embodiment, the sum can be a weighted sum.

In an embodiment, a common weight can be applied to each addend of the weighted sum, and the common weight can be an inverse of a quantity of distributed prepublication processing stages to which the segment is subjected.

In an embodiment, a weight applied to an addend of the weighted sum can be based on a processing time of a distributed prepublication processing stage to which the addend corresponds.

In an embodiment, a percent-to-time conversion factor can be calculated. The percent-to-time conversion factor can be applied to the overall extent complete to yield a time remaining until completion of distributed prepublication processing for the media item.

In an embodiment, a user indication of the overall extent complete can be provided.

In an embodiment, a user indication of the time remaining until completion of distributed prepublication processing for the media item can be provided.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
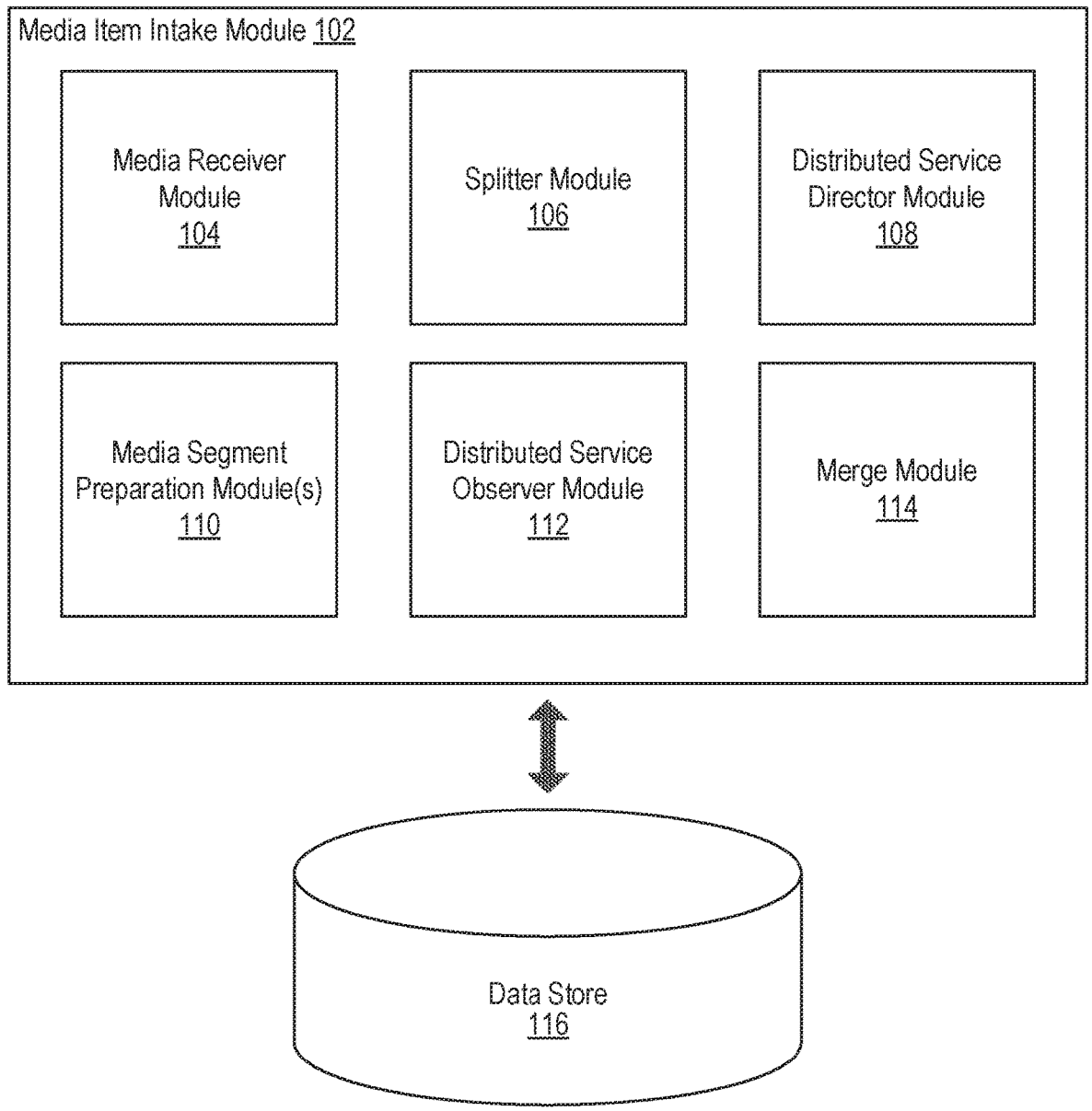
FIG. 1 illustrates an example system including an example media item intake module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION APPROACHES FOR DETERMINING PROCESSING COMPLETENESS WITHIN A DISTRIBUTED MEDIA ITEM PROCESSING ENVIRONMENT

Users often employ computing devices for a wide variety of purposes. Users can use their computing devices to, for example, interact with one another, access media items, share media items, and create media items. In some cases, media items can be provided or uploaded by users of a social networking system. The media items can be processed and published to the social networking system for consumption by others.

To be published through a social networking system, a media item provided or uploaded to the social networking system can be subjected to prepublication processing. The prepublication processing can involve a number of computationally-intensive operations. In some cases, to reduce processing time, the prepublication processing can be performed in a distributed fashion.

Even when distributed processing is employed, prepublication processing of a media item can take a significant amount of time. Conventionally, where a user provides or uploads a media item to the social networking system and that media item undergoes distributed prepublication processing, the user often does not receive any indication until the prepublication processing has completed. In many instances, no intervening progress reports or other indications are received by the user. In the absence of an intervening progress report or indication to the contrary, the user may understandably, albeit sometimes incorrectly, conclude that prepublication processing is taking too long or that it has failed. Coming to this conclusion, the user may cancel prepublication processing, thereby preventing publication of the media item to the social networking system.

Due to these or other concerns, conventional approaches can be disadvantageous or problematic. Therefore, an improved approach can be beneficial for addressing or alleviating various drawbacks associated with conventional approaches. Based on computer technology, the disclosed technology can provide, while distributed prepublication processing of a media item is proceeding, one or more indications of prepublication processing status. As one example, a user can provide or upload a media item for publication to a social networking system. In this example, prepublication processing of the media item can proceed in a distributed fashion. The prepublication processing can include splitting the media item into multiple segments which are separately processed. The multiple segments can each be subjected to multiple prepublication processing stages. As distributed prepublication processing proceeds, stage progress reports can be received. A stage progress report can indicate an extent complete for a segment with respect to a prepublication processing stage. Drawing from the stage progress reports, an overall extent complete for the prepublication processing of the media item can be calculated. The user can receive indication of the calculated extent complete. The overall extent complete calculation can be performed multiple times while distributed prepublication processing proceeds. The user can be made aware of the results of these calculations. More details regarding the disclosed technology are provided herein.

FIG. 1 illustrates an example system 100 including an example media item intake module 102 configured to receive a media item, perform distributed prepublication processing of the media item, and calculate an overall extent complete for the media item, according to an embodiment of the present disclosure. The media item can, as examples, be a two dimensional video, a 360 video item, a non-360 video item, or an audio file. As shown in the example of FIG. 1, the media item intake module 102 can include a media receiver module 104, a splitter module 106, a distributed service director module 108, media segment preparation module(s) 110, a distributed service observer module 112, and a merge module 114. In some instances, the example system 100 can include at least one data store 116. The components (e.g., modules, elements, etc.) shown in this figure and all figures herein are exemplary only, and other implementations can include additional, fewer, integrated, or different components. Some components may not be shown so as not to obscure relevant details.

In some embodiments, the media item intake module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the media item intake module 102 can be implemented, in part or in whole, as software running on one or more computing devices or systems, such as on a user or client computing device. For example, the media item intake module 102 or at least a portion thereof can be implemented as or within an application (e.g., app), a program, an applet, or an operating system, etc., running on a user computing device or a client computing system, such as a user device 610 of FIG. 6. In another example, the media item intake module 102 or at least a portion thereof can be implemented using one or more computing devices or systems that include one or more servers, such as network servers or cloud servers. In some instances, the media item intake module 102 can, in part or in whole, be implemented within or configured to operate in conjunction with a system (or service), such as a social networking system 630 of FIG. 6. It should be understood that there can be many variations or other possibilities.

The media receiver module 104 can be can be configured to receive a media item from a user of the social networking system. In one example, code running on a user device of the user can allow the user to select a media item captured or maintained by the user device. In this example, the user device can subsequently provide the media item to the media receiver module 104 via a network link. In some implementations, the media receiver module 104 can save the media item to the data store 116. It should be understood that there can be many variations or other possibilities.

Moreover, the splitter module 106 can be configured to split the media item into one or more segments. Subsequently, the splitter module 106 can pass each of the segments to a media segment preparation module 110 which can subject the segment to a first prepublication processing stage. In one example, the splitter module 106 can retrieve the media item from the data store 116. In some implementations, the splitter module 106 can determine a format of the media item and save an indication of the format at the data store 116. The distributed director module 108 can subsequently retrieve the indication from the data store 116 and employ knowledge of the format in its operations. As one example, the splitter module 106 can split the media item into segments of equal size. As another example, the media item can be split into segments of differing sizes. In these examples, the splitter module 106 can split so as to produce a predetermined quantity of segments, so as to produce segments which are each substantially of a predetermined size, and/or so as to produce segments which are each substantially of a predetermined running time. Further in these examples, the splitter module 106 can store the produced segments at the data store 116. It is contemplated that many variations are possible.

In an example, the splitter module 106 can send, with respect to each of the segments, an inquiry to the distributed service director module 108. In this example, the splitter module 106 can receive from the distributed service director module 108, in response to each inquiry, a directive. Each directive can specify a prepublication processing stage to which an associated segment should be subjected. The directive can also specify a media segment preparation module 110 which should subject the segment to the prepublication processing stage. The splitter module 106 can send, with respect to each of the segments, a prepublication processing command to a media segment preparation module 110. A prepublication processing command can, as an example, specify a segment. Also, the prepublication processing command can request that the media segment preparation module 110 subject the segment to the prepublication processing stage which was specified for the segment. Again, many variations are possible.

The distributed service director module 108 can be configured to receive from the splitter module 106 or from a media segment preparation module 110 an inquiry which corresponds to a segment. The inquiry can, as an example, specify a last prepublication processing stage to which the segment was subjected. The inquiry can further identify the segment. In response to the inquiry, the distributed service director module 108 can, based on a format of the segment, determine a next prepublication processing stage to which the segment should be subjected. The distributed service director module 108 can be aware of which media segment preparation modules 110 are free (i.e., not actively executing a prepublication processing stage). The distributed service director module 108 can provide to the sender of the inquiry a directive. Additionally, the directive can specify the determined next prepublication processing stage and can further specify one of the free segment preparation modules 110.

Moreover, each of the media segment preparation module(s) 110 can be configured to receive a prepublication processing command for a segment, process the segment as commanded, and send one or more stage progress reports regarding the segment. Each of the media segment preparation module(s) 110 can further be configured to send an inquiry seeking a directive regarding a next prepublication processing stage to which a specified segment should be subjected, receive the requested directive, and send a prepublication processing command to a target module. More details regarding the media segment preparation module(s) 110 will be provided below with reference to FIG. 2.

Further, the distributed service observer module 112 can be configured to receive one or more stage progress reports corresponding to a media item. The distributed service observer module 112 can employ the stage progress reports in calculating an overall extent complete for the media item. More details regarding the distributed service observer module 112 will be provided below with reference to FIG. 3.

Additionally, the merge module 112 can be configured to receive segments that have been processed and perform merging on the segments. In an example, the merge module 112 can receive, with respect to each of the segments of a media item, a merge command which specifies the segment. Each received segment can be one which has been subjected to all prepublication processing stages except for merging. In this example, the merge module 112 can produce from the segments passed to it a merged version of the media item. Further, the merge module 112 can release the merged version of the media item for publication through the social networking system. In some implementations, producing the merged version of the media item can include producing an index file which references the segments and specifies multiple quality levels. Moreover, in some implementations, producing the merged version of the media item can alternately or additionally include placing the segments into a single file. Again, it should be understood that there can be many variations or other possibilities.

Figure 2:
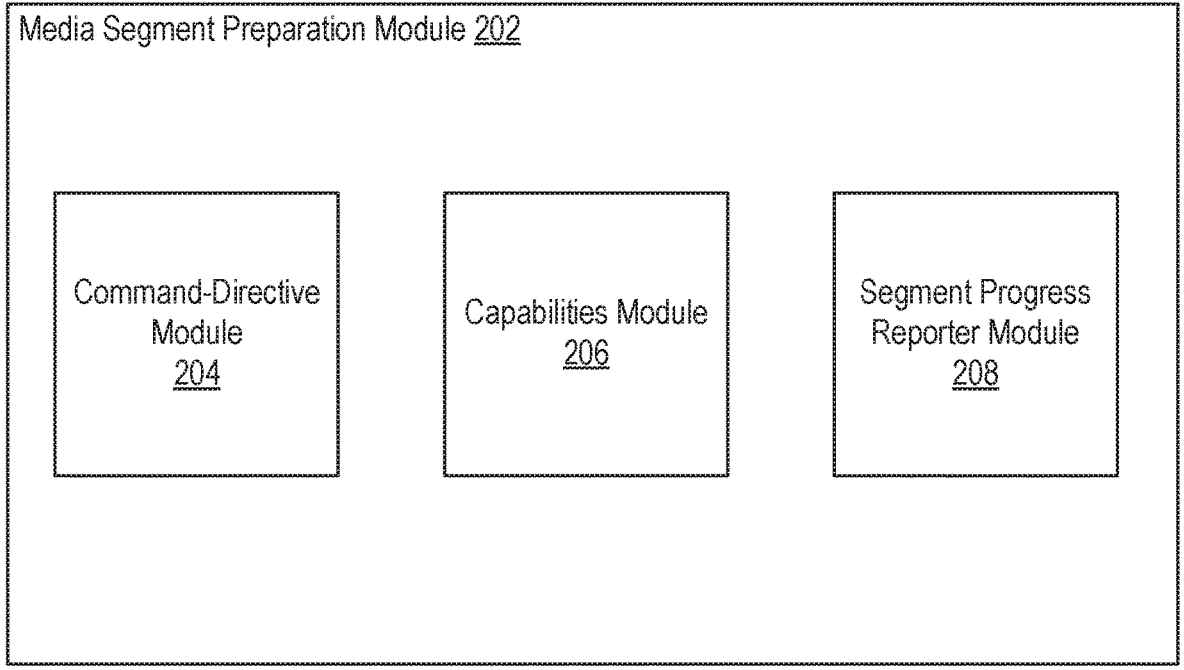
FIG. 2 illustrates an example of a media segment preparation module, according to an embodiment of the present disclosure.

FIG. 2 illustrates an example media segment preparation module 202 configured to receive a prepublication processing command for a segment, process the segment as commanded, and send one or more stage progress reports regarding the segment, according to an embodiment of the present disclosure. The media segment preparation module 202 is, according to certain embodiments, also configured to send an inquiry seeking a directive regarding a next prepublication processing stage to which a specified segment should be subjected. In certain embodiments, the media segment preparation module 202 is additionally configured to receive the directive and send, based on the directive, a prepublication processing command to a target module. In some embodiments, the media segment preparation module 110 of FIG. 1 can be implemented as the example media segment preparation module 202. As shown in FIG. 2, the media segment preparation module 202 can include a command-directive module 204, a capabilities module 206, and a segment progress reporter module 208.

The command-directive module 204 can be configured to receive a prepublication processing command sent to the media segment preparation module 202. As examples, the prepublication processing command can be sent by a media segment preparation module 110, or by the splitter module 106. In one example, the prepublication processing command can specify a segment and can specify a prepublication processing stage to which the segment should be subjected. In this example, the command-directive module 204 can send a capabilities demand to the capabilities module 206. The capabilities demand can specify the segment and the prepublication processing stage, as discussed in more detail below.

Additionally, the command-directive module 204 can be configured to send an inquiry to the distributed service director module 108. As an example, the inquiry can be sent subsequent to the capabilities module 206 completing a prepublication processing stage for a segment. In this example, the inquiry can seek a directive which provides certain information. The information can include a next prepublication processing stage to which the segment should be subjected. The information also can include a specification of a target module which should execute the next prepublication processing stage.

Moreover, the command-directive module 204 can be configured to receive a directive. In one example, the directive can be received in response to an inquiry which sought the directive. In this example, the inquiry can have been sent to the distributed service director module 108. Also in this example, the directive can have been sent by the distributed service director module 108. The directive can specify a next prepublication processing stage to which an indicated segment should be subjected. The directive can specify a target module which should perform the next prepublication processing stage. The target module can, for instance, be a media segment preparation module 110 or the merge module 114.

Further, the command-directive module 204 can be configured to send a prepublication processing command to a target module. The prepublication processing command can be based on a received directive. The prepublication processing command can specify a segment specified by the directive. The prepublication processing command can indicate a prepublication processing stage specified by the directive. The target module can be as specified by the directive. The target module can, for instance, be a media segment preparation module 110 or the merge module 114.

The capabilities module 206 can be configured to receive a capabilities demand from the command-directive module 204. The capabilities demand can specify a segment and a prepublication processing stage to which the segment should be subjected. The capabilities module 206 can subject the segment to the indicated prepublication processing stage.

The capabilities module 206 can be configured to subject a segment to one or more prepublication processing stages. In some embodiments, the prepublication processing stages can include resizing/transforming, encoding/compressing, and packaging/uploading. In other embodiments, other types or combinations of prepublication processing stages can be included. A resizing/transforming prepublication processing stage can include a resizing operation and a transforming operation. The resizing operation can, as examples, be upscaling or downscaling. The transforming operation can, as examples, include one or more of registration, fusing, morphing, and mapping to a cylinder, hemisphere, or sphere. A segment can, in some implementations, be subjected to both or only one of the resizing operation and the transforming operation. Whether the segment is subjected to both or only one of the two operations can, for instance, depend on a type of the segment. As one illustration, where the type is a 360 video, the segment can be subjected to both of the two operations. As another illustration, where the type is other than a 360 video the segment can be subjected to the resizing operation but not the transforming operation. An encoding/compressing prepublication processing stage can include an encoding operation and a compressing operation. The encoding operation can, for instance, place the segment in a target format. In some cases, placing the segment in the target format can include transcoding the segment from an initial format. A packaging/uploading prepublication processing stage can include a packaging operation and an upload operation. The packaging operation can, as an example, include placing the segment in the form of a file. The uploading operation can, as an example, involve saving the segment to the data store 116. A segment can, in some implementations, be subjected to both or only one of the packaging operation and the uploading operation. Whether the segment is subjected to both or only one of the two operations can, for instance, depend on a way in which the media item is to be made available via the social networking system. As an illustration, where the media item is to be made available as a multiple quality offering, the segment can be subjected to both of the two operations. The multiple quality offering can, for instance, be Dynamic Adaptive Streaming over Hypertext Transfer Protocol (DASH). As another illustration, the segment can be subjected to only the uploading operation. Many variations are possible.

The segment progress reporter module 208 can be configured to produce one or more stage progress reports and send those reports to the distributed service observer module 112. In some implementations, a stage progress report can specify information about a segment which is being processed by the capabilities module 206. For example, the information can indicate an extent to which the capabilities module 206 has completed processing of the segment. The processing can correspond to a prepublication processing stage being executed. In one example, the extent complete can be expressed as a percentage. In some implementations, the segment can be held in an input data structure. The capabilities module 206 can proceed through the input data structure, draw data from the input data structure, apply the processing to the drawn data, and place a result of the processing in an output data structure. In this implementation, the segment progress reporter module 208 can consider a percentage of the input data structure through which it has proceeded to be the current extent complete. Many variations are possible.

Furthermore, the segment progress reporter module 208 can produce and send the stage progress reports periodically. The segment progress reporter module 208 can produce and send the stage progress reports when selected percentage-complete thresholds are reached. In some implementations, the information in the stage progress reports can indicate more than the extent of processing completeness. As one example, the information in a stage progress report can also indicate the prepublication processing stage being executed. As another example, the information can include an identifier of a segment being processed by the segment progress reporter module 208 and an identifier of a media item to which the segment corresponds. It should be appreciated that all examples herein are provided for illustrative purposes and that many variations are possible.

Figure 3:
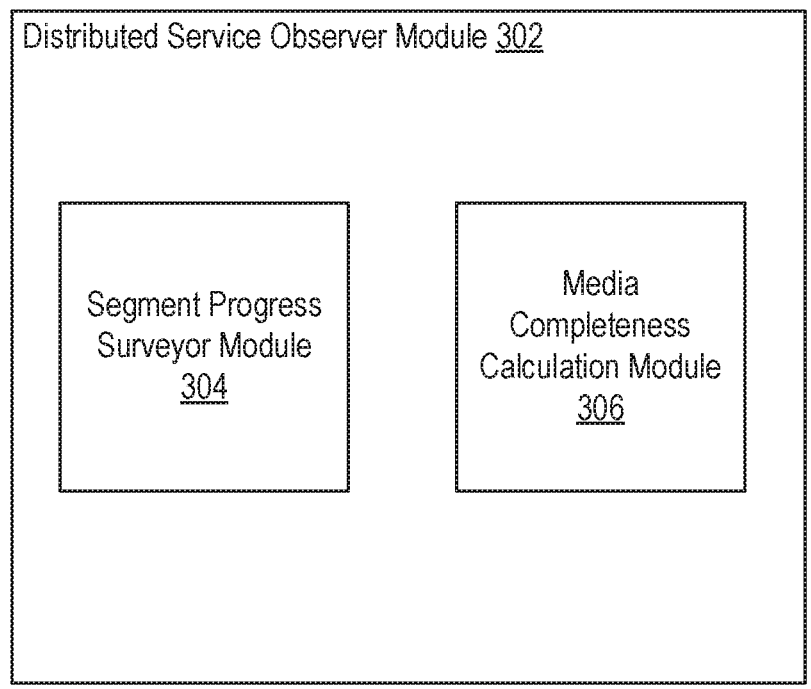
FIG. 3 illustrates an example of a distributed service observer module, according to an embodiment of the present disclosure.

FIG. 3 illustrates an example distributed service observer module 302 configured to receive one or more stage progress reports corresponding to a media item, and employ the stage progress reports in calculating an overall extent complete for the media item, according to an embodiment of the present disclosure. In some embodiments, the distributed service observer module 112 of FIG. 1 can be implemented as the example distributed service observer module 302. As shown in FIG. 3, the distributed service observer module 302 can include a segment progress surveyor module 304 and a media completeness calculation module 306.

The segment progress surveyor module 304 can be configured to receive one or more stage progress reports corresponding to a media item, and make the stage progress reports available to the media completeness calculation module 306. As one example, the segment progress surveyor module 304 can receive a stage progress report sent to the distributed service observer module 112 by the segment progress reporter module 208. In some implementations, the segment progress surveyor module 304 can save the received stage progress report. In one example, the received stage progress report can be saved at the data store 116. In this example, the media completeness calculation module 306 can later retrieve the stage progress report from the data store 116.

In some embodiments, the media completeness calculation module 306 can be configured to obtain one or more stage progress reports corresponding to a media item. The stage progress reports can have been made available by the segment progress surveyor module 304. Furthermore, in some embodiments the media completeness calculation module 306 can be configured to utilize the stage progress reports in calculating an overall extent complete for the media item. Additionally, in some embodiments, the media completeness calculation module 306 can make the overall extent complete available for presentation to a user.

In some embodiments, the media completeness calculation module 306 can calculate the overall extent complete for the media item via phases. In one example, for a first phase, the media completeness calculation module 306 can calculate the extent complete for each of the segments which make up the media item. For a second phase, the media completeness calculation module 306 can compute a sum across the results of the first phase. It should be understood that there can be many variations or other possibilities.

For the first phase, the media completeness calculation module 306 can calculate the extent complete for a segment by computing a sum. The addends of the sum can be the extents complete for each of the prepublication processing stages to which the segment is subjected. For example, the extents complete for each of the prepublication processing stages to which the segment is subjected can be known by the stage progress reports which the media completeness calculation module 306 has obtained. In some cases, the sum can be a weighted sum. In one example, a common weight can be applied to each of the addends of the sum. In this example, the common weight can be the inverse of the quantity of the prepublication processing stages to which the segment is subjected. As an illustration, where the segment is subjected to three prepublication processing stages, the common weight can be ⅓. As another example, the weight applied to one of the addends can reflect a relative processing time of the prepublication processing stage to which the addend corresponds.

As an illustration of calculating the extent complete for a segment which makes up a media item, the segment can be subjected to the prepublication processing stages of resizing/transforming, encoding/compressing, and packaging/upload. In this illustration, the stage progress reports can specify the extent complete for the resizing/transforming prepublication processing stage to be 100%. The stage progress reports can specify the extent complete for the encoding/compressing prepublication processing stage to be 50%. The stage progress reports can specify the extent complete for the packaging/uploading prepublication processing stage to be 0%. A common weight of ⅓ can be applied. For this illustration, the calculated extent complete for the segment can be 0.499, reflecting the weighted sum (⅓*1.00)+(⅓*0.50)+(⅓*0.0). Again, all examples herein are provided for illustrative purposes and many variations are possible.

For the second phase, the media completeness calculation module 306 can compute the overall extent complete for the media item as a sum. The addends of the sum can be the extents complete, calculated in the first phase, for each of the segments which make up the media item. In some cases, the sum of the second phase can be a weighted sum. In some implementations, the media item can be split into segments of equal size. In other embodiments, the media item can be split into segments of differing sizes. In one example, a common weight can be applied to each of the addends of the sum of the second phase. In this example, the common weight can be the inverse of the quantity of segments into which the media item has been split. As an illustration, where the media item is split into ten segments, the common second phase weight can be ⅒. A common weight can, for instance, be employed in the implementations where the media item is split into segments of equal size. As another example, the weight applied to one of the addends of the second phase can reflect a relative size of the segment. As an illustration, the media item can be split into three segments. The size of the first segment can be 50% of the total size of the media item. The size of the second segment can be 30% of the total size of the media item. The size of the third segment can be 20% of the total size of the media item. In this illustration, the weight for the addend for the first segment can be 0.50. The weight for the addend for the second segment can be 0.30. The weight for the addend for the third segment can be 0.20. As discussed, it is contemplated that many variations are possible.

As an illustration of computing the overall extent complete for the media item via the second phase, the media item can be split into three segments. The first phase can have determined the extent complete for the first segment of the media item to be 0.265. The first phase can have determined the extent complete for the second segment of the media item to be 0.6875. The first phase can have determined the extent complete for the third segment of the media item to be 0.725. Continuing with the illustration, a common weight of ⅓ can be applied. For this illustration, the overall extent complete for the media item can be 0.6792, reflecting the weighted sum (⅓*0.625)+(⅓*0.6875)+(⅓*0.725). There can be many variations or other possibilities.

In some embodiments, the media completeness calculation module 306 can determine an estimated time remaining until completion of prepublication processing for the media item. In one example, the media completeness calculation module 306 can determine the estimated time remaining by ascertaining an amount of time that has elapsed while performing the prepublication processing for the media item. In this example, the media completeness calculation module 306 can also access the overall extent complete for the media item. Further in this example, the media completeness calculation module 306 can employ the elapsed time and the overall extent complete for the media item in calculating a percent-to-time conversion factor. Additionally, in this example, the media completeness calculation module 306 can apply the percent-to-time conversion factor to the overall extent complete in order to yield the estimated time remaining until completion of prepublication processing for the media item.

As a further example, the media completeness calculation module 306 can make the overall extent complete for the media item available for presentation to a user who is submitting a media item to the media item intake module 102. For example, the media completeness calculation module 306 can save the overall extent complete which it has calculated for the media item. In one example, the calculated overall extent complete for the media item can be saved at the data store 116. In this example, a user presentation module (not shown) can later retrieve from the store the calculated overall extent complete for the media item and present the calculated overall extent complete to the user.

Figure 4A:
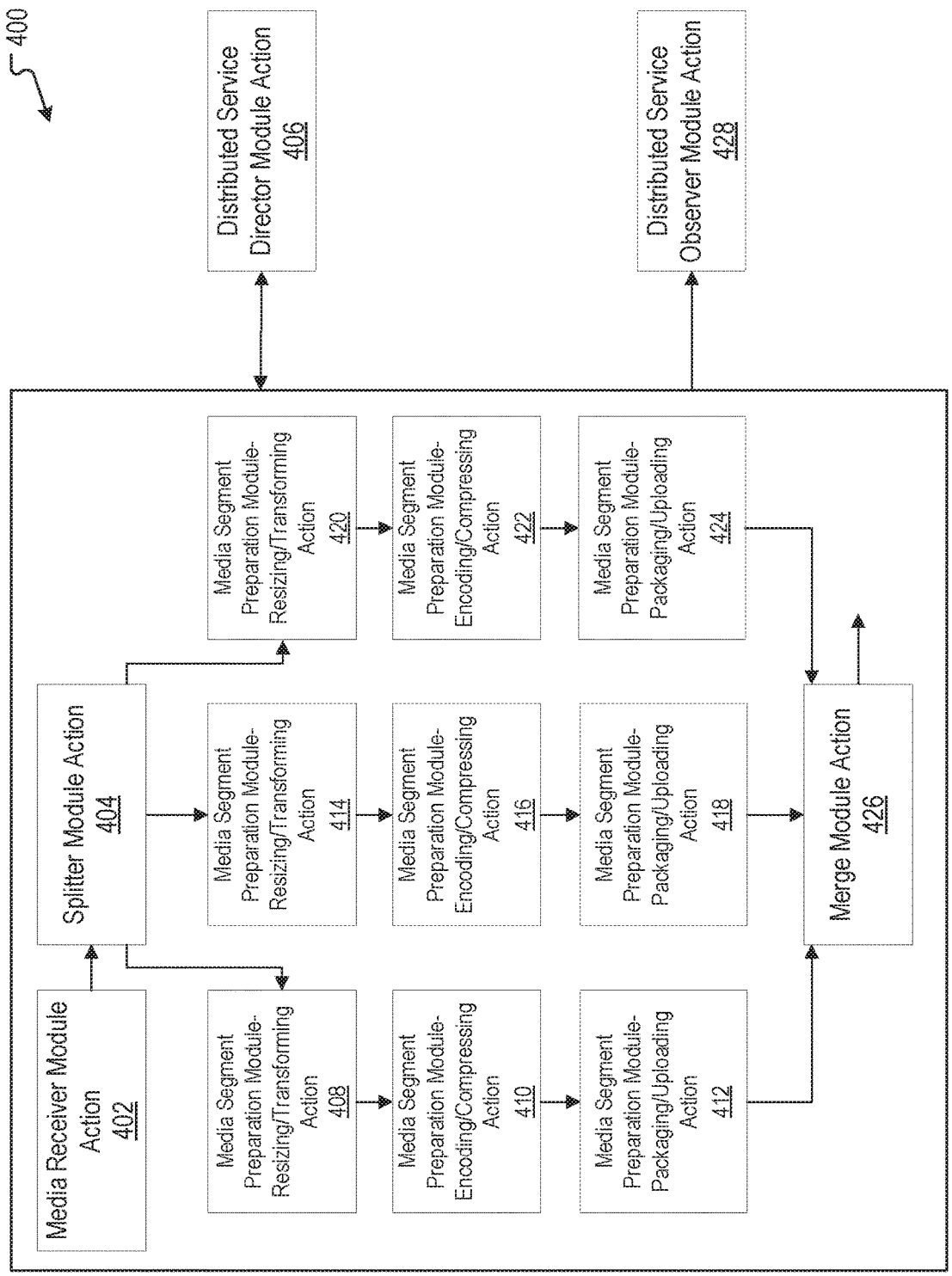
FIG. 4A illustrates an example functional block diagram, according to an embodiment of the present disclosure.

FIG. 4A illustrates an example functional block diagram 400, according to an embodiment of the present disclosure. FIG. 4A illustrates receiving a media item and performing distributed prepublication processing upon the media item with degrees of processing completeness being calculated. At block 402, the media receiver module 104 can receive a media item. At block 404, the splitter module 106 can split the media item into, as an example, three segments. In other examples, the media item can be split into a different quantity of segments. Further, at block 404, the splitter module 106 can send three inquiries to the distributed service director module 108. Each of the three inquiries can correspond to one of the three segments. At block 406, the distributed service director module 108 can send the splitter module 106 three directives. Each of the three directives can correspond to one of the three segments. Each of the three directives can specify a media segment preparation module 110, and also a next prepublication processing stage of resizing/transforming.

At block 404, the splitter module 106 can send a prepublication processing command with respect to each segment. A prepublication processing command for a segment can be sent to the media segment preparation module 110 which was specified by the directive received for that segment. At blocks 408, 414, and 420, each of the three media segment preparation modules 110 which received a prepublication processing command via block 404 can subject its received segment to resizing/transforming. With completion of resizing/transforming, each of the three media segment preparation modules 110 can, additionally at blocks 408, 414, and 420, send an inquiry to the distributed service director module 108.

At block 406, the distributed service director module 108 can send, to each of the three media segment preparation modules 110 of blocks 408, 414, and 420, a directive. A directive can specify a media segment preparation module 110, and also a next prepublication processing stage of encoding/compressing. At blocks 408, 414, and 420, each of the three media segment preparation modules 110 of these blocks can send a prepublication processing command to the media segment preparation module 110 which was specified by the directive. At blocks 410, 416, and 422, each of the three media segment preparation modules 110 which receives one of the prepublication processing commands can perform encoding/compressing. At blocks 410, 416, 422, and 406, operations analogous to those discussed can result in the distributed service director module 108 causing the three segments to next be sent to media segment preparation modules 110 for packaging/uploading. At blocks 412, 418, and 424, the packaging/uploading can be performed. Further in the example, via blocks 412, 418, 424, and 406, operations analogous to those discussed can result in the distributed service director module 108 causing the three segments to all be sent to the merge module 114 for merging. At block 426, merging can be performed on the segments. With completion of the merging, the merged version of the media item can be released to the social networking system by the merge module 114.

In some implementations, the media segment preparation modules 110 can each produce one or more stage progress reports. The stage progress reports can each indicate an extent to which the media segment preparation module 110 has completed processing of a segment. In one example, the produced stage progress reports can be sent by the media segment preparation modules 110 to the distributed service observer module 112. In this example, the produced stage progress reports can be received at the distributed server observer module 112 via block 428. The distributed service observer module 112 can utilize the produced stage progress reports in calculating an overall extent complete for the media item. The overall extent complete for the media item can, for instance, be presented to a user who provided the media item to the social networking system. Again, many variations are possible.

Figure 4B:
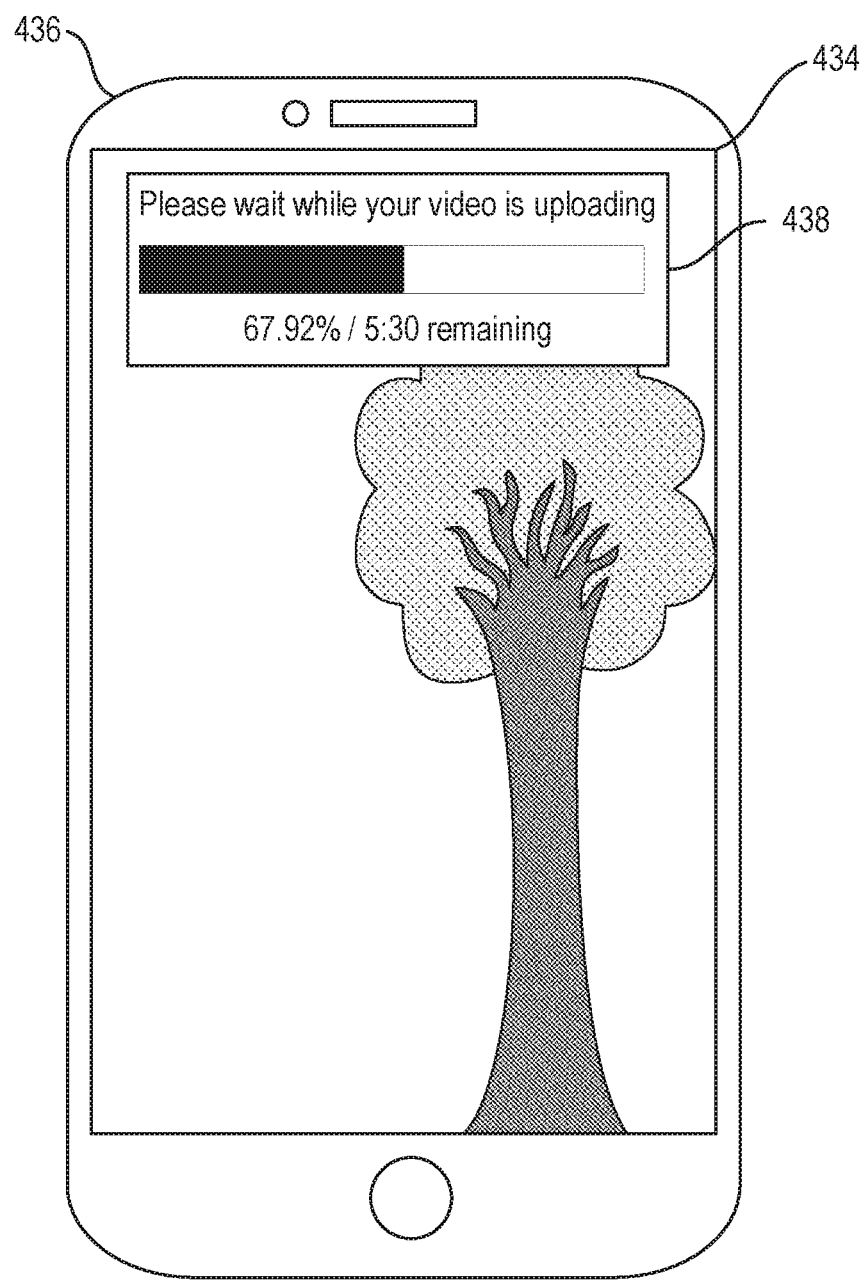
FIG. 4B illustrates an example interface, according to an embodiment of the present disclosure.

FIG. 4B illustrates an example of an interface 434, according to an embodiment of the present disclosure. The interface can be presented on the display of a computing device 436 of user who has provided a media item for publication to a social networking system. The interface 434 can be provided through an application running on the computing device 436, such as an app or via a web browser. A The user can be presented, through the interface 436, with an overall extent complete for the media item. The interface 434 can include a display region 438 which can be superimposed over a preview frame of the media item. The display region 438 can convey to the user an overall extent complete of prepublication processing of the media item. The overall extent complete of prepublication processing of the media item can be expressed as a percentage or as an estimated time remaining. In the example shown, the overall extent complete is indicated as a percentage (i.e., 67.92%) and an estimated time remaining (i.e., five minutes and thirty seconds) until completion of the prepublication processing of the media item. Once again, many variations are possible.

Figure 5:
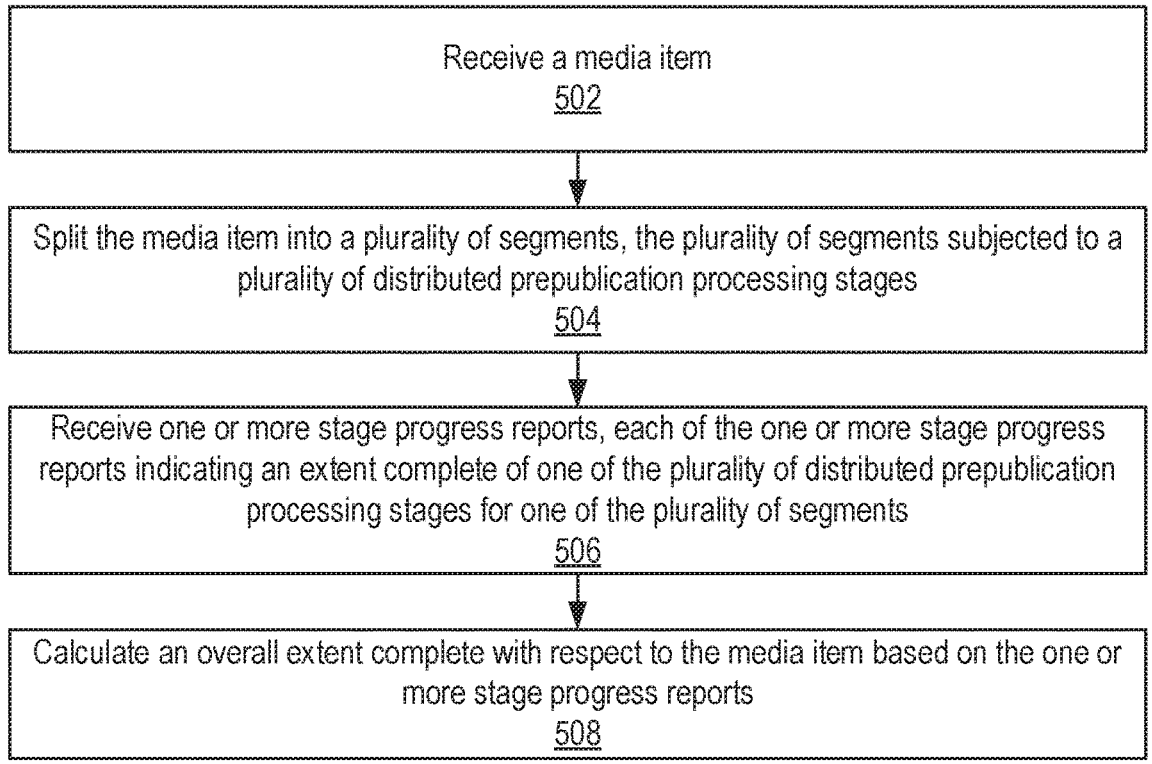
FIG. 5 illustrates an example process, according to an embodiment of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 can receive a media item. At block 504 the process can split the media item into a plurality of segments, the plurality of segments subjected to a plurality of distributed prepublication processing stages. At block 506 the process can receive one or more stage progress reports, each of the one or more stage progress reports indicating an extent complete of one of the plurality of distributed prepublication processing stages for one of the plurality of segments.

Then at block 508 the example process 500 can calculate an overall extent complete with respect to the media item based on the one or more stage progress reports.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
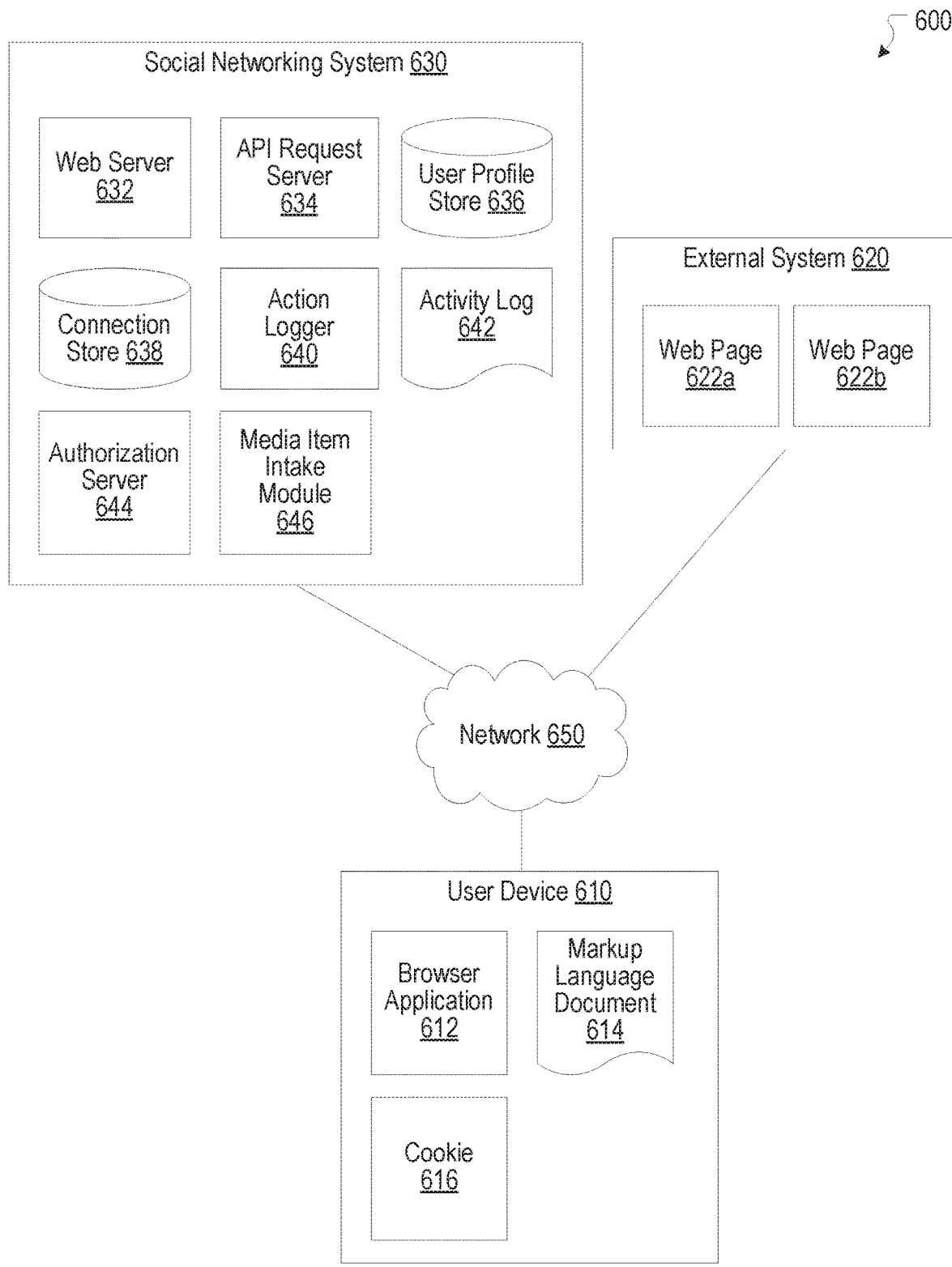
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects an other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a media item intake module 646. The media item intake module 646 can, for example, be implemented as the media item intake module 102 of FIG. 1. As discussed previously, it should be appreciated that there can be many variations or other possibilities.

Hardware Implementation

Figure 7:
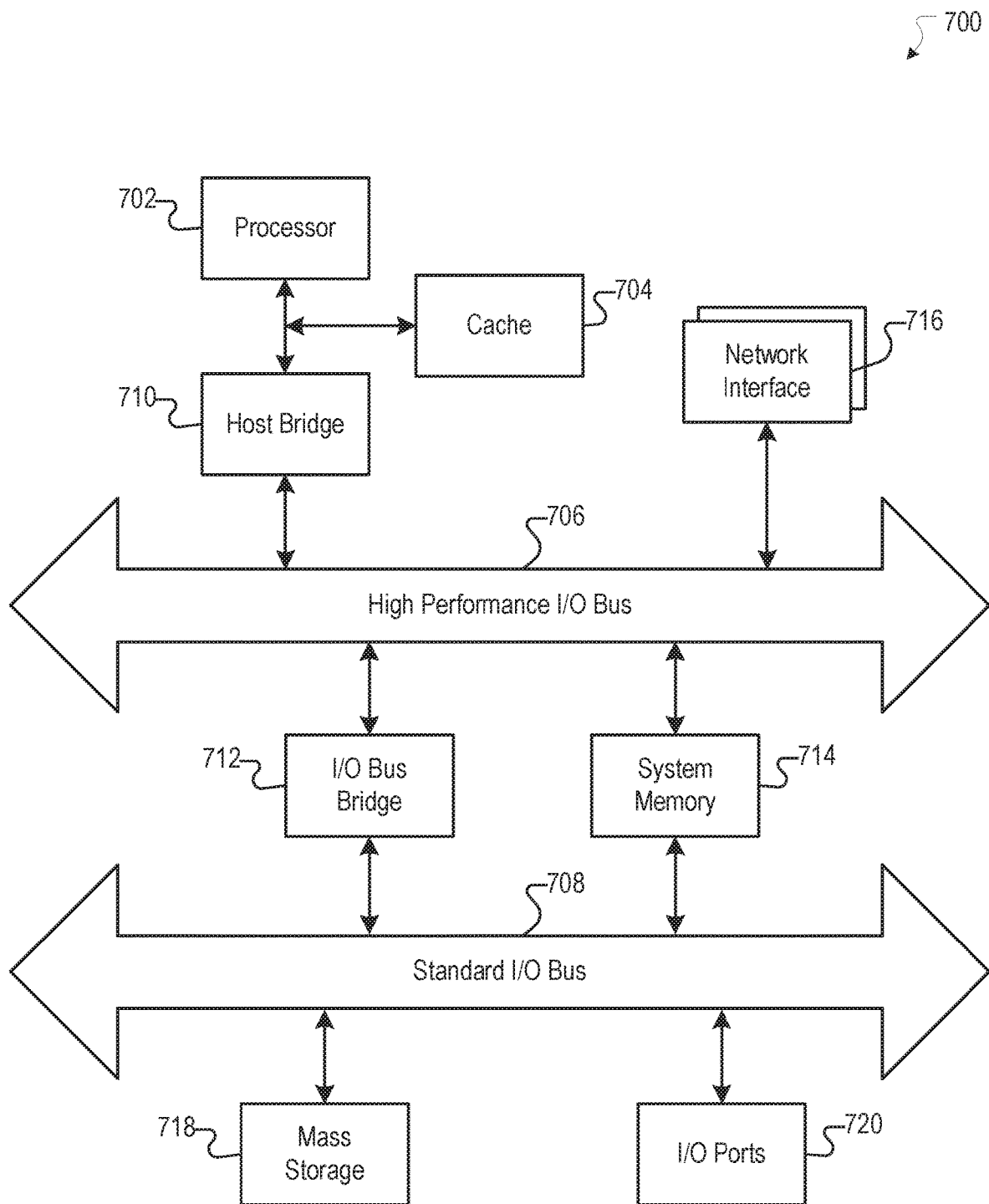
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing device, a media item and a directive associated with at least one of: a resizing or a transforming operation to be performed on the media item;
   splitting, by the computing device, the media item into a plurality of segments of a plurality of sizes, wherein at least one size of the plurality of sizes is different from another size of the plurality of sizes and wherein the directive specifies which segment of the plurality of segments is subjected to which distributed prepublication processing stage of a plurality of distributed prepublication processing stages based on capabilities of the distributed prepublication processing stages;
   receiving, by the computing device, one or more stage progress reports, wherein each of the one or more stage progress reports indicates an extent complete of one of the plurality of distributed prepublication processing stages for one of the plurality of segments and each of the one or more stage progress reports are sent based on satisfaction of a selected percentage-complete threshold between 0% and 100%; and
   calculating, by the computing device, an overall extent complete with respect to the media item based on a weight applied to the extent complete indicated by the one or more stage progress reports, wherein the weight is based on the plurality of sizes and a total size of the media item.

2. The computer-implemented method of claim 1, further comprising:
   calculating, by the computing device, an extent complete for a segment of the plurality of segments based on stage progress reports associated with the segment.

3. The computer-implemented method of claim 2, wherein the calculating the overall extent complete comprises calculating a sum across the extents complete calculated for each of the plurality of segments.

4. The computer-implemented method of claim 2, wherein the calculating the extent complete for a segment comprises calculating a sum across stage progress reports associated with the segment.

5. The computer-implemented method of claim 4, wherein the sum is a weighted sum.

6. The computer-implemented method of claim 1, wherein the weight is further based on a total number of segments.

7. The computer-implemented method of claim 1, wherein the weight is further based on a plurality of processing times associated with the plurality of distributed prepublication processing stages.

8. The computer-implemented method of claim 1, further comprising:
   calculating, by the computing device, a percent-to-time conversion factor; and
   applying, by the computing device, the percent-to-time conversion factor to the overall extent complete to yield a time remaining until completion of distributed prepublication processing for the media item.

9. The computer-implemented method of claim 1, further comprising:
providing, by the computing device, a user indication of the overall extent complete.

10. The computer-implemented method of claim 8, further comprising:
providing, by the computing device, a user indication of the time remaining until completion of distributed prepublication processing for the media item.

11. A system comprising:
at least one processor; and
a memory storing instructions that, when executed by the at least one processor, cause the system to perform:
receiving a media item and a directive associated with at least one of: a resizing or a transforming operation to be performed on the media item;
splitting the media item into a plurality of segments of a plurality of sizes, wherein at least one size of the plurality of sizes is different from another size of the plurality of sizes and wherein the directive specifies which segment of the plurality of segments is subjected to which distributed prepublication processing stage of a plurality of distributed prepublication processing stages based on capabilities of the distributed prepublication processing stages;
receiving one or more stage progress reports, wherein each of the one or more stage progress reports indicates an extent complete of one of the plurality of distributed prepublication processing stages for one of the plurality of segments and each of the one or more stage progress reports are sent based on satisfaction of a selected percentage-complete threshold between 0% and 100%; and
calculating an overall extent complete with respect to the media item based on a weight applied to the extent complete indicated by the one or more stage progress reports, wherein the weight is based on the plurality of sizes and a total size of the media item.

12. The system of claim 11, further comprising:
calculating an extent complete for a segment of the plurality of segments based on stage progress reports associated with the segment.

13. The system of claim 12, wherein the calculating the overall extent complete comprises calculating a sum across the extents complete calculated for each of the plurality of segments.

14. The system of claim 12, wherein the calculating the extent complete for a segment comprises calculating a sum across stage progress reports associated with the segment.

15. The system of claim 11, further comprising:
providing a user indication of the overall extent complete.

16. A non-transitory computer-readable storage medium including instructions that, when executed by at least one processor of a computing system, cause the computing system to perform a method comprising:
receiving a media item and a directive associated with at least one of: a resizing or a transforming operation to be performed on the media item;
splitting the media item into a plurality of segments of a plurality of sizes, wherein at least one size of the plurality of sizes is different from another size of the plurality of sizes and wherein the directive specifies which segment of the plurality of segments is subjected to which distributed prepublication processing stage of a plurality of distributed prepublication processing stages based on capabilities of the distributed prepublication processing stages;
receiving one or more stage progress reports, wherein each of the one or more stage progress reports indicates an extent complete of one of the plurality of distributed prepublication processing stages for one of the plurality of segments and each of the one or more stage progress reports are sent based on satisfaction of a selected percentage-complete threshold between 0% and 100%; and
calculating an overall extent complete with respect to the media item based on a weight applied to the extent complete indicated by the one or more stage progress reports, wherein the weight is based on the plurality of sizes and a total size of the media item.

17. The non-transitory computer-readable storage medium of claim 16, further comprising:
calculating an extent complete for a segment of the plurality of segments based on stage progress reports associated with the segment.

18. The non-transitory computer-readable storage medium of claim 17, wherein the calculating the overall extent complete comprises calculating a sum across the extents complete calculated for each of the plurality of segments.

19. The non-transitory computer-readable storage medium of claim 17, wherein the calculating the extent complete for a segment comprises calculating a sum across stage progress reports associated with the segment.

20. The non-transitory computer-readable storage medium of claim 16, further comprising:
providing a user indication of the overall extent complete.

* * * * *